United States Patent [19]

Tanaka et al.

[11] Patent Number: 4,700,219
[45] Date of Patent: Oct. 13, 1987

[54] COLOR IMAGING APPARATUS

[75] Inventors: Takanori Tanaka; Takashi Kitagawa, both of Tokyo, Japan

[73] Assignee: NEC Corporation, Tokyo, Japan

[21] Appl. No.: 720,870

[22] Filed: Apr. 8, 1985

[30] Foreign Application Priority Data

Apr. 9, 1984 [JP] Japan .................................. 59-70434

[51] Int. Cl.$^4$ ............................................. H04N 9/73
[52] U.S. Cl. ......................................... 358/29; 358/41; 358/43
[58] Field of Search ...................... 358/29 F, 29 C, 29, 358/41, 43, 44, 50

[56] References Cited

U.S. PATENT DOCUMENTS

| 3,772,459 | 11/1973 | Nakajima | 358/29 C |
|---|---|---|---|
| 3,821,791 | 6/1974 | Nakajima | 358/29 C |
| 4,219,841 | 8/1980 | Nishimura et al. | 358/29 C |
| 4,281,337 | 7/1981 | Nakamura | 358/29 C |
| 4,335,397 | 6/1982 | Tamura | 358/29 C |
| 4,355,325 | 10/1982 | Nakamura et al. | 358/29 C |

FOREIGN PATENT DOCUMENTS

| 0110486 | 8/1980 | Japan | 358/29 |
|---|---|---|---|
| 0122283 | 9/1981 | Japan | 358/29 |
| 0013878 | 1/1982 | Japan | 358/29 |
| 0042390 | 3/1983 | Japan | 358/29 |

Primary Examiner—Michael A. Masinick
Assistant Examiner—E. Anne Toth
Attorney, Agent, or Firm—Burns, Doane, Swecker & Mathis

[57] ABSTRACT

A color imaging apparatus which produces a luminance signal and a plurality of chrominance signals in order to generate a composite color video signal which is capable of compensating a color reproduction characteristic in response to a variation of the color temperature of the incident light. A signal representative of the color temperature of the light is used to control the gain of the color difference signals and/or control the phase difference between a plurality of color subcarriers on which the chrominance signals are modulated. The color temperature signal can be produced from a white-balancing circuit or by a separate color temperature detector.

8 Claims, 4 Drawing Figures

COLOR IMAGING APPARATUS

BACKGROUND OF THE INVENTION

This invention relates to a color imaging apparatus, more particularly to a color imaging apparatus capable of compensating a color reproduction characteristic in response to a variation of a color temperature of a light.

A conventional simplified single-chip color imaging apparatus generates a signal representing luminance information and a plurality of signals representing color information from an output signal of a single-chip imaging device. The signals representing color information are obtained as a difference signal or sum signal between two color signals and are used for providing two color difference signals necessary to obtain a composite color video signal.

In a conventional single-chip CCD camera as disclosed, for example, in an article entitled "Single Chip CCD Color Camera Using Field Integration Mode" by Y. Sone et al. published in the "Technical Report of the Institute of Television Engineers of Japan" TEB87-3 ED 691, pp 23–28 (Mar. 18, 1983), two color difference signals 2R-G and 2B-G are obtained line-sequentially from n-th and (n+1)-th lines, respectively and are delayed by one-horizontal scanning period (1H). Ratio of the signal components R, G and B included in the color difference signals is determined by characteristics of color filters. In the case where light separation characteristics of the color filters are defined so that the best color reproduction characteristic is obtained by using a light having a color temperature of 3200 K., the ratio of the color signal components R, G and B included in the color difference signals obtained by using the light of a different color-temperature varies in accordance with the color temperature so that the ratio of the signal component R becomes large under a lower color-temperature and the ratio of the signal component B becomes large under a higher color-temperature. Since the ratio of the signal components R, G and B determines final imaging characteristics of the color difference signals, the variation of the color temperature deteriorates the color reproduction characteristic.

To prevent the deterioration of the color reproduction characteristic, an optical system for the conventional imaging apparatus necessitates color-temperature converting filters. In order to convert the color temperature in a wide range from lower than 3000 K. (for incandescent lamps) to higher than 10000 K. (for outdoors) into the specific color-temperature for the standard light (for example, 3200 K.) with a less error, there must be provided a great number of color-temperature converting filters having optical characteristics different from one another. This causes inconvenience in a practical use of the color imaging apparatus. In contrast therewith, a lesser number of color-temperature converting filters deteriorates the color reproduction characteristic.

SUMMARY OF THE INVENTION

It is, therefore, an object of this invention to provide a color imaging apparatus capable of compensating a deterioration of a color reproduction characteristic depending on a variation of the color temperature of the light with a simplified construction.

According to this invention, there is provided a color imaging apparatus in which a luminance signal and two color difference-signals are derived from an output signal of an imaging device and used for providing a composite color video signal. The levels of the two color difference signals and two color sub-carriers which are to be modulated by the color difference signals are controlled in response to the color temperature of the light.

Other features and advantages of this invention will be apparent from the following detailed description of preferred embodiments of this invention taken in conjunction with the accompanying drawings, wherein:

DESCRIPTION OF THE PREFERRED EMBODIMENT

Figure 1:
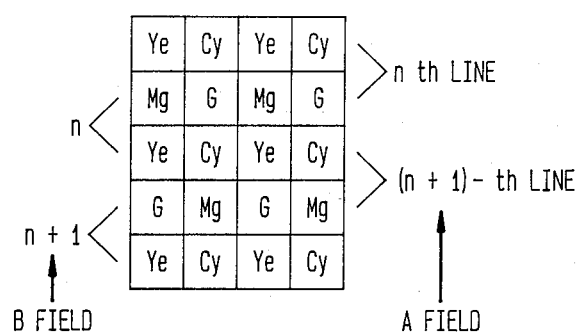
FIG. 1 is a schematic view illustrating a color arrangement in a color filter for use in a color imaging apparatus.

In a standard three-chip imaging apparatus in which an incident light is separated by an optical separation system into three primary colors R, G and B which are applied to three imaging devices, a white balance is maintained by gain-controlling (equalizing) the three-primary-color signals derived from the three imaging devices. The two color-difference signals for providing the composite color video signal are obtained from the equalized three-primary-color signals. Therefore, the ratio of the signal components R, G and B included in the two color difference signals is not varied without regard to the variation of the color temperature, thereby to maintain the satisfactory color reproduction characteristic.

However, in the single-chip imaging device in which the color difference signals are derived directly from the imaging device, in order to separately gain-control three primary color signals, the three-primary-color signals are derived from the color difference signals derived from the imaging device by separating and demodulating, and then equalized by gain-controlling, and the color difference signals are finally reproduced. This operation is complicated and not practical.

The levels of the positive and negative polarity signal components included in the color difference signals are varied, that is, the ratio of the color signals R, G and B included in the color difference signals is varied in response to the color temperature of the light. When the levels of the positive and negative polarity signal components are equal to each other in the case of achromic color lighting, the color difference signals do not become zero and the white balance can not be maintained. The white balance is maintained by compensating the levels of the positive and negative polarity signal components so that the color difference signals can become zero in the case of the achromic lighting. However, the ratio of the color signals R, G and B included in the white-balanced color difference signals are still varied with variation of the color temperature.

The white-balanced color difference signals quadrature-modulate the color sub-carriers having different phases from each other so as to obtain the carrier chrominance signals. In the NTSC color television system, the signal B-Y corresponds to the color sub-carrier having a phase of 0°, and the signal R-Y to that having a phase of 90°. At any phase angle $\theta$, the color difference signals include the color signal components R, G and B defined by the composition of vector between the R-Y signal and the B-Y signal. For example, when $\theta=33°$, Q signal is represented by $E_Q=0.21E_R-0.52E_G+0.31E_B$, and when $\theta=123°$, I signal by $E_I=0.60E_R-0.28E_G+0.32E_B$. This means, in the case where the color difference signals are derived directly from the imaging device, that a phase at which the ratio of the signal components R, G and B, obtained by the composition of vectors between the R-Y signal and the B-Y signal becomes equal to that included in the two color difference signals, is a phase between the color difference signals. However, since the ratio of the signal components R, G and B in the two color difference signals is varied with the variation of the color temperature, the ratio obtained by the composition of vectors is also varied. This indicates that in the case where the phases of the color sub-carriers to be quadrature-modulated by the color difference signals are maintained constant, the color reproduction characteristic is deteriorated with the variation of light.

According to this invention, in order to compensate for the deterioration of the color reproduction characteristics, the phase variation of the two color difference signals is compensated by phase-controlling the color sub-carriers in response to the color temperature of the light. The levels of the color difference signals are also controlled in response to the color temperature.

Figure 2:
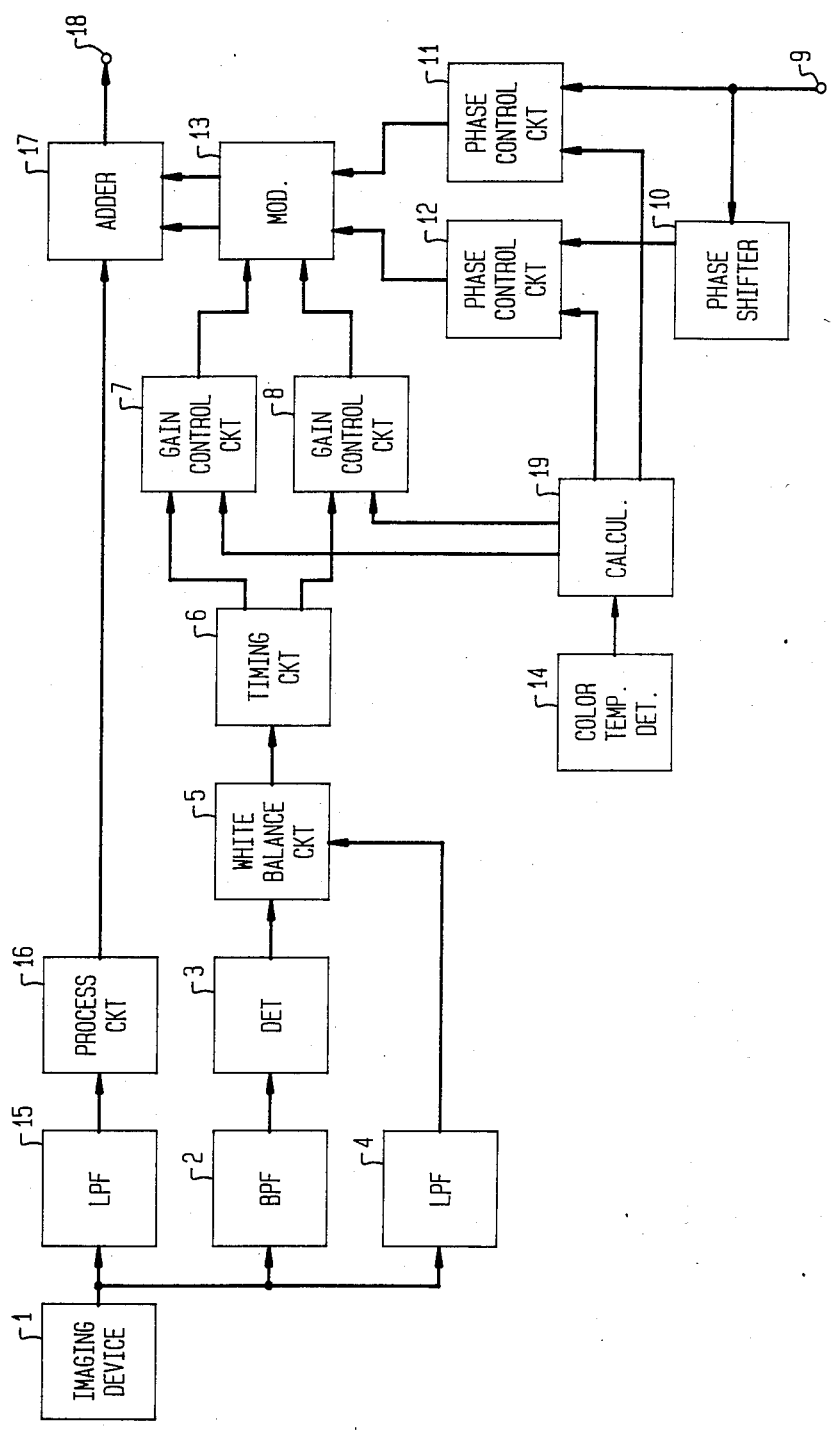
FIG. 2 is a schematic block diagram of a first embodiment of this invention.

Referring to FIG. 1, there is shown a part of a color filter which is provided on an imaging device 1 (FIG. 2). The imaging device 1 generates an output signal by adding two picture-element signals derived from two picture elements positioned in a vertical direction. More specifically, there are produced the output signals (Ye+Mg), (Cy+G), (Ye+Mg), . . . in an n-th line and the output signals (Ye+G), (Cy+Mg), (Ye+G), . . . in an (n+1)-th line. The output signals in each line contains modulated components having a repetition frequency of two horizontal picture-elements. Since the modulated components are (Ye+Mg)—(Cy+G)=2R—G and (Ye+G)—(Cy+Mg)=2B—G in the n-th and (n+1)-th lines, respectively, two color difference signals are obtained for every one horizontal scanning line.

Referring to FIG. 2, in a first embodiment of this invention, the output signal from the imaging device 1 is supplied to a band-pass-filter 2 to obtain the modulated components included therein. The obtained modulated components are detected by a detector 3 to demodulate the color difference signals.

The output signal of the imaging device 1 is also supplied to a low pass filter 4 to obtain a low-frequency component, which is then supplied to a white balance circuit 5. The white balance circuit 5 performs the white balancing by achieving an adding and/or subtraction between the demodulated color difference signals and the output signal of the low-pass filter 4 so that the color difference signals become zero when an object of achromatic color is picked up. The two color difference signals, which are line-sequentially derived from the white balance circuit 5, are supplied to a timing circuit 6, in which the two line-sequential color-difference signals are delayed by means of a 1H delay line so as to simultaneously obtain two color-difference signals. The two (first and second) simultaneous color-difference signals are respectively supplied to first and second gain-control circuits 7 and 8, in which the grains of the color difference signals are controlled independently of each other.

A color-temperature detector 14 detects the color temperature of the light for lighting the object which is picked up by the imaging device 1. The color-temperature detector 14 may be composed of means for separating the incident light to the three-primary-color lights, and means for providing a color temperature signal representing the color temperature from the magnitudes of the three-primary-color lights. The color temperature signal is supplied to a control signal calculator 19 for generating first and second control signals, whose values are continuously varied in response to the color temperature. The first and second control signals are supplied to the first and second gain-control circuits 7 and 8 to gain-control the first and second color-difference signals in response to the color temperature of the light, respectively. The gain-controlled first and second color-difference signals are supplied to a modulator 13.

On the other hand, a first-phase color sub-carrier for the first color difference signal is supplied from a terminal 9 to a phase shifter 10 to produce a second-phase color sub-carrier. The first- and second-phase color sub-carriers are supplied to first and second phase-control circuits 11 and 12, which are also supplied with the third and fourth control signals, respectively. In the first- and second-phase-control circuits 11 and 12, the phases of the first- and second-phase color sub-carriers are controlled in response to the color temperature of the light so as to compensate for the deterioration of the the color reproduction characteristic depending on the variation of the color temperature of the light.

The phase-controlled first- and second-phase color sub-carriers are supplied to a modulator 13, and modulated by the gain-controlled first and second color-difference signals supplied from the first and second gain-control circuits 7 and 8 to provide two carrier chrominance sinagls, respectively. The carrier chrominance signals are supplied to an adder which is also supplied with a luminance signal which is derived from the output signal of the imaging device 1 by passing through a low-pass filter 15 and a processing circuit 16, thereby to obtain at an output terminal 18 the composite color video signal whose color reproduction characteristic has been compensated.

Figure 3:
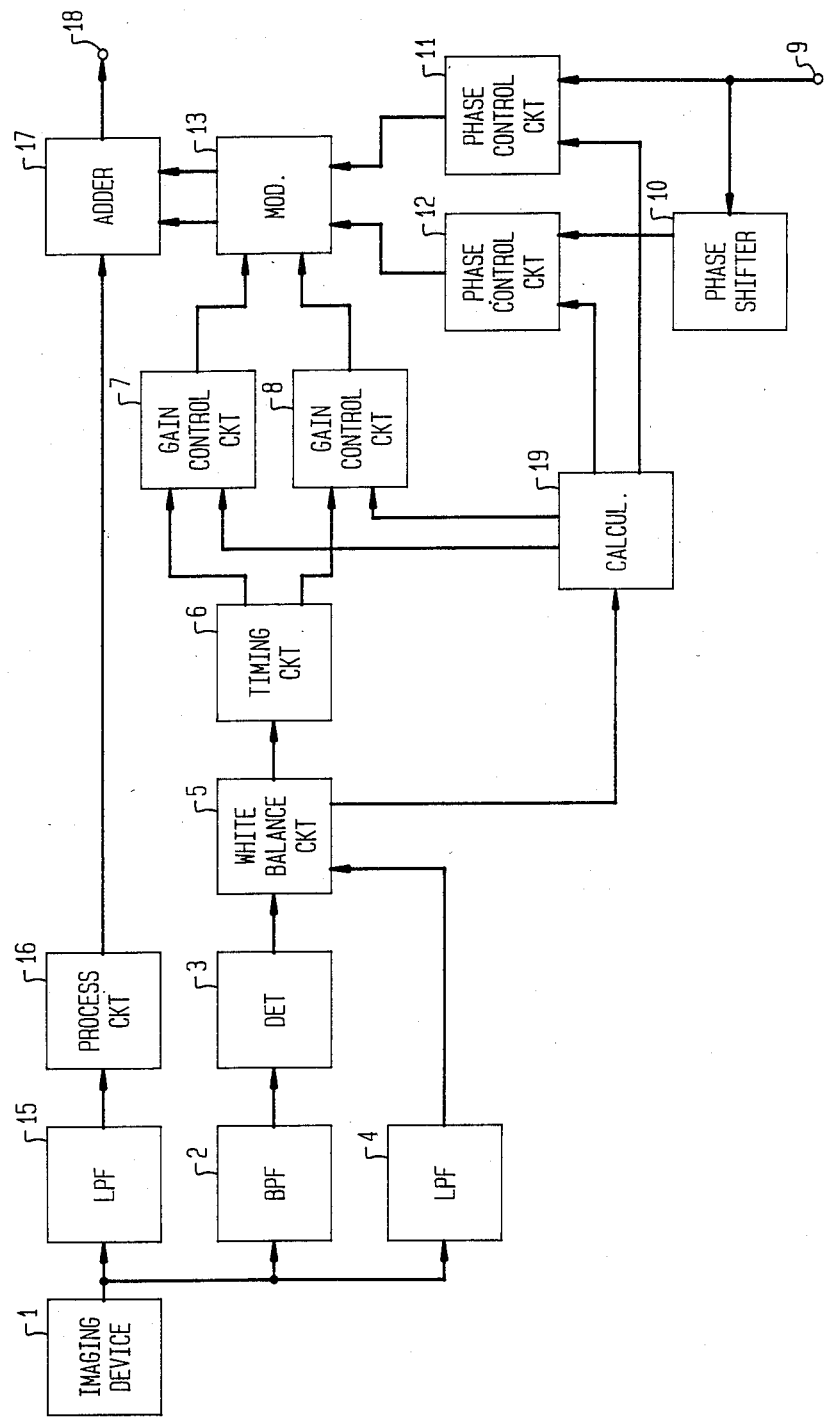
FIG. 3 is a schematic block diagram of a second embodiment of this invention.

Referring to FIG. 3, a second embodiment of this invention is identical to the first embodiment shown in FIG. 2 except that the color-temperature detector 14 is omitted and a white-balance compensating signal in the white balance circuit 5 is used as a signal representing the color temperature of the light. This is based on the fact that the white-balance compensating signal for use in the white balance circuit 5 varies in correspondence with the color temperature of the light.

Figure 4:
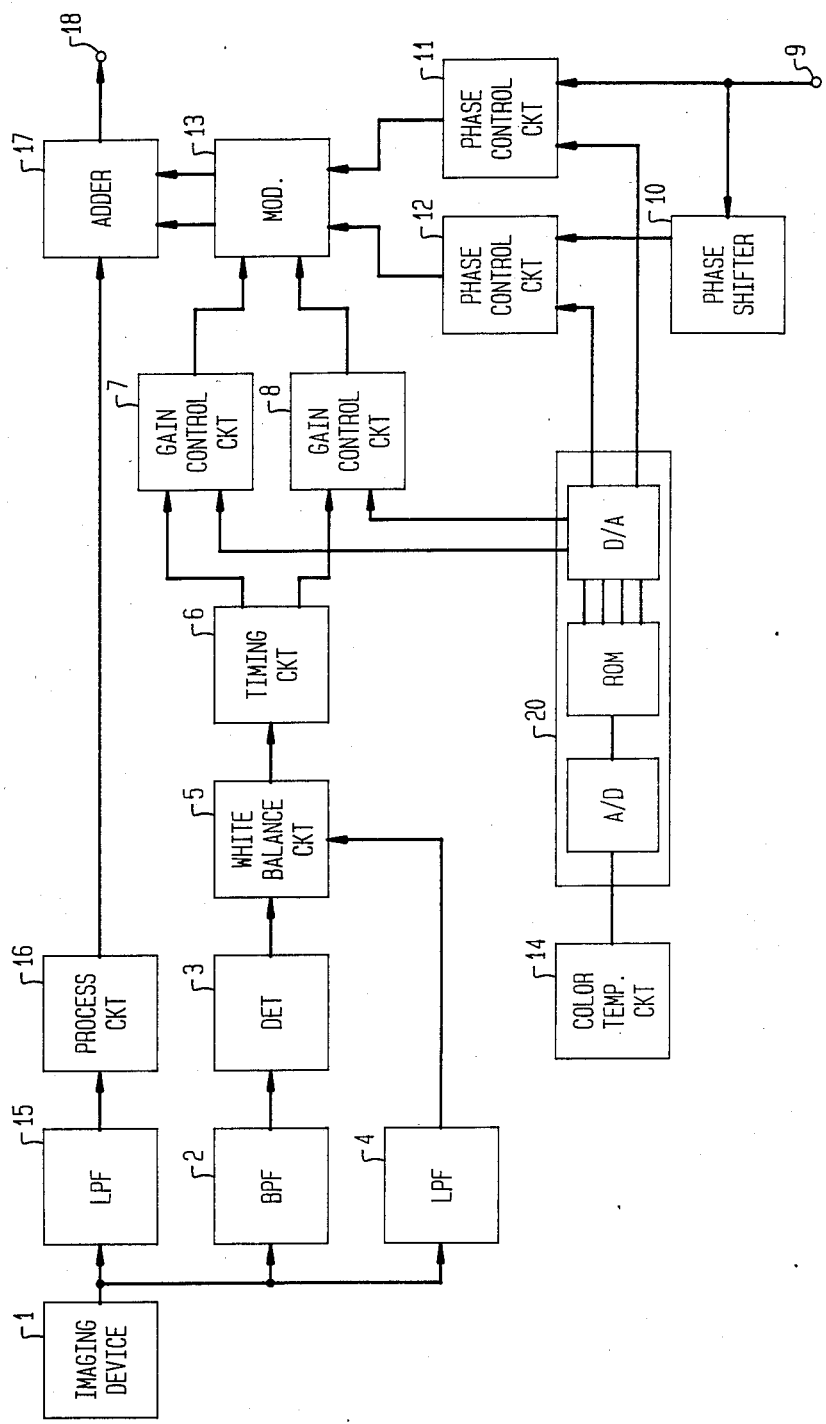
FIG. 4 is a schematic block diagram of a third embodiment of this invention.

Referring to FIG. 4, a third embodiment of this invention is identical to the first embodiment shown in FIG. 2 except that there is provided, instead of the control signal calculator 19, a control signal setting circuit 20 for providing the first to fourth control signals whose levels are digitally varied in response to the color temperature. The control signal setting circuit 20 may be composed of an analog-to-digital (A/D) converter for converting the color temperature signal to a digital color temperature signal, a read-only-memory (ROM) in which the digital color temperature signal is applied as an address data and first to fourth digital control signals are outputted, and a digital-to-analog (D/A) converter for converting the first to fourth digital control signals to the first to fourth control signals, which are then supplied to the first and second gain-control circuits 7 and 8 and the first and second phase-control circuits 11 and 12. Even when the adjusting values for gain- and phase-controlling are complicated functions of the color temperature, they have previously been calculated and written into the ROM. Further, since the control signals are obtained every one frame period, it is possible to use the A/D and D/A converters having low converting speeds. These make it possible to simplify the construction of the control signal setting circuit 20.

It is noted that it is possible to use the control signal setting circuit 20 instead of the control signal calculator 19 in the second embodiment shown in FIG. 3.

What is claimed is:

1. A color imaging apparatus comprising:
   an imaging device for generating a luminance signal and a plurality of color difference signals to a plurality of filter means, a first one of said filter means for providing a low-pass signal to a processing circuit, and second and third ones of said filter means for providing a demodulated signal and a low-pass signal, respectively, to a white balance circuit;
   means for providing a plurality of carrier chrominance signals by modulating a plurality of color sub-carriers having different phases from one another by said color difference signals, said carrier chrominance signals responsive to signals received via said white balance circuit;
   means for producing a composite color video signal from said luminance signal received from said processing circuit and said carrier chrominance signals;
   means for providing a color temperature signal representing the color temperature of a light; and
   means responsive to said color temperature signal for compensating a color reproduction characteristic of said composite color video signal.

2. The color imaging apparatus as claimed in claim 1, in which said color temperature signal providing means provides a white-balance compensating signal as said color temperature signal.

3. The color imaging apparatus as claimed in claim 1, in which said compensating means includes means for gain-controlling said color difference signals in response to said color temperature signal.

4. The color imaging apparatus as claimed in claim 1, in which said compensating means includes means for phase-controlling said color sub-carriers in response to said color temperature signal.

5. The color imaging apparatus as claimed in claim 1, in which said compensating means includes means responsive to said color temperature signal for generating control signals for controlling the characteristic of said composite color video signal.

6. The color imaging apparatus as claimed in claim 5, in which said control signal generating means includes a control signal setting circuit having an analog-to-digital converter for converting said color temperature signal to a digital color temperature signal, a read-only-memory in which said digital color temperature signal is applied as address data and digital control signals are outputted, and a digital-to-analog converter for converting said digital control signals to said control signal.

7. A color imaging apparatus comprising:
   an imaging device for generating a luminance signal and a plurality of color difference signals to a plurality of filter means, a first one of said filter means for providing a low-pass signal to a processing circuit, and second and third ones of said filter means for providing a demodulated signal and a low-pass signal, respectively, to a white balance circuit;
   means for providing a color temperature signal responsive to the color temperature of a light;
   means for providing a plurality of carrier chrominance signals by modulating a plurality of color sub-carriers having different phases from one another by said color difference signals, said carrier chrominance signals responsive to said color temperature signal and signals from said white balance circuit;
   means for producing a composite color video signal from said luminance signal via said processing circuit and from said carrier chrominance signals; and
   means responsive to said color temperature signal for compensating a color reproduction characteristic of said composite color video signal.

8. A color imaging apparatus comprising:
   an imaging device for generating a luminance signal and a plurality of color difference signals to a plurality of filter means, a first one of said filter means for providing a low-pass signal to a processing circuit, and second and third ones of said filter means for providing a demodulated signal and a low-pass signal, respectively, to a white balance circuit;
   timing circuit means coupled for receiving first and second line-sequential, color-difference signals from said white balance circuit;
   first and second gain control means coupled for independently controlling gains of said first and second line-sequential, color-difference signals, respectively;
   means for providing a color temperature signal;
   means coupled for receiving said color temperature signal and for generating first and second control signals to said first and second gain control means in response to color temperature;
   modulator means coupled for receiving gain controlled first and second color difference signals generated by said first and second gain control means;
   means for generating first and second phase color sub-carriers for said first and second color difference signals;
   first and second phase control means coupled for receiving said first and second phase color sub-carriers and for receiving third and fourth signals from said means for generating said first and second control signals, whereby phases of said first and second phase color sub-carriers are controlled in response to color temperature;
   said modulator means also coupled for receiving said phase controlled first and second phase color sub-carriers, whereby said phase controlled first and second color sub-carriers are modulated by said gain controlled first and second color difference signals for providing carrier chrominance signals; and
   adder means coupled for receiving said luminance signal from said processing circuit and for receiving said carrier chrominance signals for providing a composite color video signal.

* * * * *